United States Patent
Farrell

[11] Patent Number: 5,354,021
[45] Date of Patent: Oct. 11, 1994

[54] AN ADJUSTABLE CLAMP

[76] Inventor: Darvel B. Farrell, 8211 116th Ave. SE., Renton, Wash. 98056

[21] Appl. No.: 177,284

[22] Filed: Jan. 4, 1994

[51] Int. Cl.⁵ .............................................. F16L 3/08
[52] U.S. Cl. .................................. 248/74.3; 24/16 PB; 248/74.5
[58] Field of Search ............... 248/74.3, 74.5, 74.1, 248/74.2, 68.1; 24/16 R, 16 PB; 174/40 R

[56] References Cited

U.S. PATENT DOCUMENTS

| | | | |
|---|---|---|---|
| 2,379,568 | 7/1945 | Ellinwood | 174/40 R |
| 2,438,362 | 3/1948 | Dunkelberger at al. | 174/40 |
| 2,884,214 | 4/1959 | Wrobel | 248/74 |
| 3,022,557 | 2/1962 | Logan | 24/17 |
| 3,155,355 | 11/1964 | Cappola | 248/74.3 |
| 3,169,005 | 2/1965 | Wallach | 248/74 |
| 3,515,363 | 6/1970 | Fisher | 248/71 |
| 3,632,070 | 1/1972 | Thayer | 248/74.3 X |
| 3,942,750 | 3/1976 | Noorily | 248/74 |
| 4,153,228 | 5/1979 | Delserro et al. | 248/74 |
| 4,272,870 | 6/1981 | McCormick | 24/16 PB |
| 4,274,612 | 6/1981 | Massey | 248/74 |
| 4,287,644 | 9/1981 | Durand | 24/16 PB |
| 4,372,011 | 2/1983 | Aranyos | 24/20 TT |
| 4,439,896 | 4/1984 | Matsui | 24/16 PB |
| 4,510,650 | 4/1985 | Espinoza | 24/16 PB |
| 4,779,828 | 10/1988 | Munch | 248/74.3 |
| 4,854,014 | 8/1989 | Shaull | 24/16 R |
| 4,911,388 | 3/1990 | Unger | 248/75 |
| 4,925,136 | 5/1990 | Knott | 248/74.3 X |
| 5,042,114 | 8/1991 | Parrish | 24/16 PB |

Primary Examiner—J. Franklin Foss

[57] ABSTRACT

An adjustable wiring harness clamp (10) including a base portion (16), a loop portion (18), and a clamp mechanism (14). The base portion (16) includes an opening (20) for inserting a fastener (22) in order to secure the clamp to a structure, and an opening (32) for receiving clamp mechanism (14). Loop portion (18) includes an inner surface (24), an outer surface (25), and a tapered free end (28). Outer surface (25) includes a groove (26) for receiving a band (36) of clamp mechanism (14). Groove (26) is contiguous opening (32). Adjustment of clamp mechanism (14) contracts loop portion (18) and reduces its size to accommodate smaller size harnesses.

9 Claims, 3 Drawing Sheets

AN ADJUSTABLE CLAMP

TECHNICAL FIELD

This invention pertains to wiring harness clamps, and more particularly, to flexible, adjustable lobe-type clamps for securing bundles of wires, cables or the like.

BACKGROUND OF THE INVENTION

In the manufacture of commercial airplanes, a large number of wires are run throughout the airplanes connecting various pieces of electronic equipment. Typically, the wires are run together in bundles to form a wiring harness, and the wiring harness is secured to the structure of the airplane by means of clamps. Federal Aviation Administration (FAA) regulations require wiring harnesses to be securely fastened within the clamps so that the individual wires of the harness are held firmly in close engagement with each other. This helps prevent damage to the wires caused by abrasion between the wires and their supports.

Clamps for securing wiring harnesses and bundles of wires are generally well known. One type of such clamp is known as a P-clamp, which comprises a mounting bracket having a loop portion and two extensions extending from the ends of the loop portion. The extensions align with one another and have aligned openings for receiving a fastener for securing the clamp to a structure. The loop portion of the P-clamp is not adjustable and because of this, P-clamps are made in a variety of sizes to accommodate wiring harnesses of different sizes.

With the P-clamp, because the mounting fastener is used to close the bundle of wires, individual wires cannot be added or removed from the clamp while the clamp is fastened to a structural member. In order to add or remove an individual wire or wires, the P-clamp must be demounted from the structure. Likewise, while a wiring harness is being created, the harness cannot be supported on the structural member by a P-clamp. If wires are added to or removed from a bundle, resulting in a change in the bundle's size, the P-clamp must be exchanged for one of different size.

Another type of clamp is known as an "alligator clamp." An alligator clamp includes a flexible C-shaped loop portion and a base portion extending from the back side of the loop portion. The base portion is mounted to a structural member to secure the clamp. The ends of the C-shaped loop are spaced from each other for the addition or removal of wires from the clamp. The ends of the C-shaped loop are closed by a nylon wire tie, or the like. Although an alligator clamp can be mounted to a structural member without being closed, the loop portion of the alligator clamp is open completely when the nylon wire tie is not fastened thereto. This arrangement allows individual wires to fall out of the clamp as the wiring harness is being created and, subsequently, when wires are added to or removed from the clamp.

Other types of clamps are disclosed by U.S. Pat. No. 3,169,005, of I. D. Wallach, entitled, "Resilient Sheet Material Bracket to Support Wires", issued Feb. 9, 1965; and U.S. Pat. No. 4,153,228, of Delserro et al, entitled, "Self-Tightening Clamp", issued May 8, 1979. The Wallach patent discloses a split sleeve wire bracket having a looped portion and a leg portion formed integrally from a sheet of plastic or other suitable material. The looped portion forms a complete circle to close on itself for securing a plurality of wire strands or cables. The bracket disclosed by this patent is not adjustable to accommodate wire bundles of varying diameter.

The Delserro patent discloses a self-tightening clamp having a first, counter-clockwise curved portion and a second, clockwise curved portion, with the second curved portion encircling the first curved portion. The second curved portion has an extension, and the clamp is provided with a base, wherein the end portion of the base is adapted to be secured to the end portion of the extension. Securing of the extension to the base causes the second curved portion to contract the first curved portion, thereby reducing its diameter. Like the P-clamps, the clamp disclosed in the Delserro patent must be demounted in order to allow for the addition or removal of an article from within the first curved portion.

Accordingly, the present invention is directed toward a wiring harness clamp that is adjustable in size and which provides for the easy addition or removal of wires from the clamp without the necessity of demounting the clamp, and which is designed to hold the wires in its unclamped mounted position. While the present invention is particularly well suited for clamping wiring harnesses, it is believed to have general utility for holding a variety of articles. Accordingly, it is not intended that the scope of the present invention be limited to wiring harnesses.

DISCLOSURE OF THE INVENTION

Briefly described, the present invention is an adjustable clamp for securing a bundle of wires or the like in close engagement, wherein the clamp comprises a base portion adapted for mounting to a structure, and a loop portion, including an inner surface, an outer surface, and a free end, extending from the base portion. The free end is adapted to engage the inner surface. The loop portion has sufficient flexibility so that the free end can be moved progressively inwardly of the loop in engagement with the inner surface thereof in order to contract the size of the loop, and can be moved away from the inner surface of the loop to create a gap for the insertion and removal of wires. The clamp also includes a clamp mechanism for securing around the outer surface of the loop portion in order to contract the size of the loop.

The clamp mechanism is adjustable in order to selectively contract the size of the loop. The clamp mechanism can be progressively, incrementally tightened to contract the loop for smaller bundles of wires. The clamp mechanism is secured releasably around the loop portion and can be cut and removed from the loop portion in order to separate the free end of the loop portion from the inner surface. The clamp mechanism preferably is a nylon wire tie, which is relatively inexpensive and can be discarded after use.

Preferably, the free end of the loop portion is tapered. This provides a smooth inner surface between the free end and the initial section of the loop.

According to an aspect of the invention, the base portion includes an opening through which the clamp mechanism is adapted to extend. The opening allows the clamp mechanism to extend around the loop portion past the base portion.

Preferably, the clamp mechanism includes a band and an incrementally adjustable lock mechanism, and the outer surface of the loop portion includes a groove for receiving the band and restraining lateral movement of the band with respect to the loop portion.

The free end of the loop portion can be moved away from the inner surface of the loop to create a gap with the base portion mounted to the structure. This allows for the addition or removal of wires from the loop portion without having to demount the clamp.

According to an alternative embodiment of the invention, the outer surface portion adjacent the free end of the loop portion includes a ridge, and the inner surface portion adjacent the base portion includes a groove for receiving the ridge. The ridge and groove are adapted to restrain lateral movement of the free end with respect to the inner surface.

These and other advantages and features will become apparent from the following detailed description of the best mode for carrying out the invention and the accompanying drawings, and the claims, which are incorporated herein as part of the disclosure of the invention.

BRIEF DESCRIPTION OF THE DRAWINGS

Like numerals refer to like parts throughout the several views, wherein.

BEST MODE FOR CARRYING OUT THE INVENTION

Figure 1:
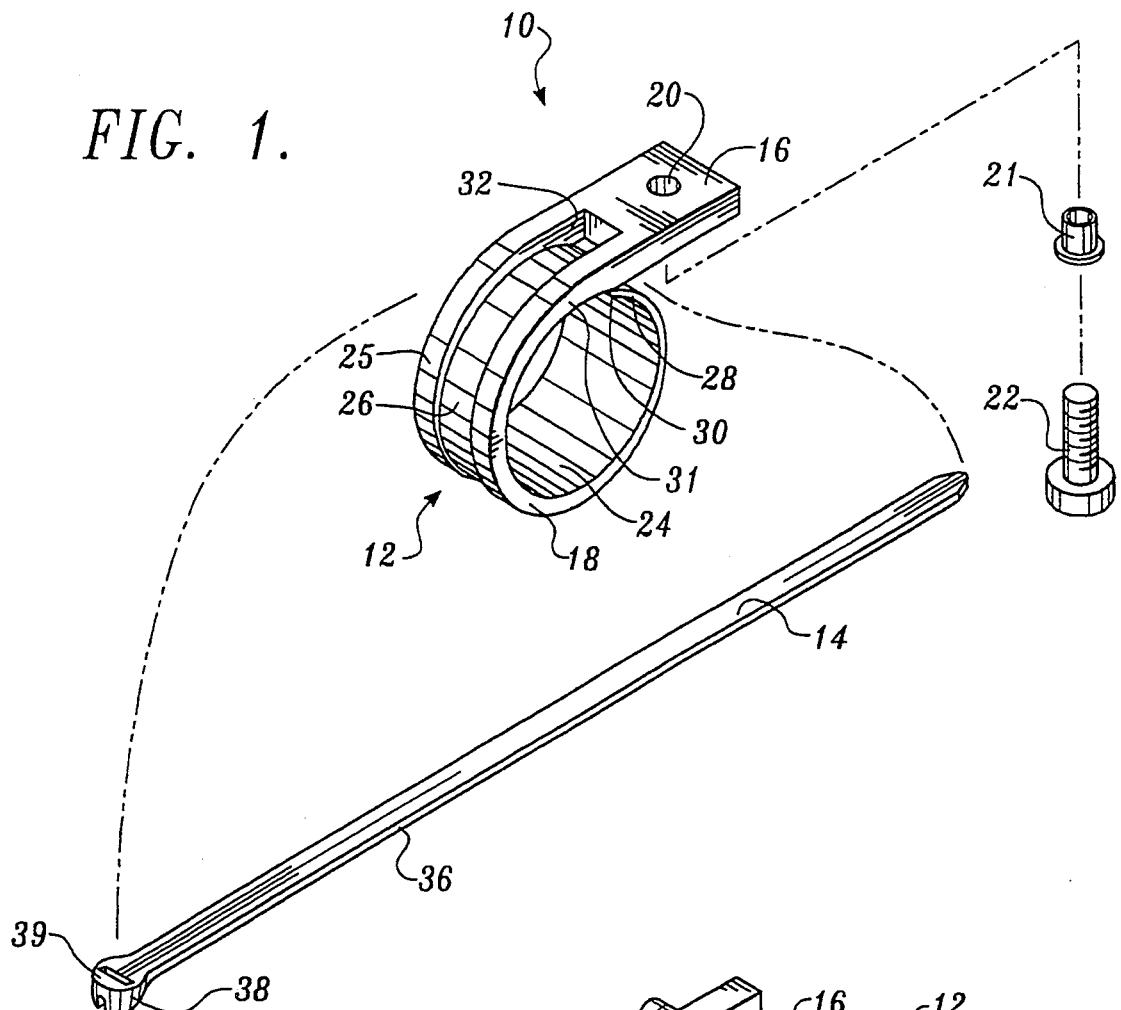
FIG. 1 is an exploded view of the adjustable clamp of the present invention.

Referring to FIG. 1, the adjustable clamp 10 of the present invention includes a mounting bracket 12 and a clamp mechanism 14. The mounting bracket 12 includes a base portion 16 and a loop portion 18. The base portion 16 is substantially flat along its length and includes an opening 20 for receiving an eyelet 21 and a fastener 22. Eyelet 21 is held securely within opening 20. Fastener 22 secures mounting bracket 12 to a structural member such as, for example, a stringer forming part of the structural frame of the fuselage of an aircraft.

The loop portion 18 of mounting bracket 12 is formed integral with base portion 16, and mounting bracket 12 is made of a single sheet of plastic or other suitable material that will retain its shape, as shown. The mounting bracket 12 is formed by any process suitable for the material chosen. For plastic, the mounting bracket 12 can be, for example, injection molded or heated and shaped in a mandrel, or stamped and subsequently cold-worked.

Loop portion 18 includes an inner surface 24 and an outer surface 25. Outer surface 25 includes a central groove 26 extending around its perimeter. Central groove 26 is sufficiently wide to accommodate clamp mechanism 14. The free end 28 of loop portion 18 tapers to a narrow leading edge 30. This provides a substantially smooth inner surface 24 between free end 28 and the initial section 31 of loop portion 18.

A rectangular opening 32 is formed in the base portion 16 adjacent the initial section 31 of loop portion 18. Opening 32 is contiguous with groove 26. Opening 32 provides a passage for clamp mechanism 14 around loop portion 18 past base portion 16.

Clamp mechanism 14 can be any type of clamp mechanism adapted to engage loop portion 18 and contract the loop portion and thereby reduce its diameter or size. Preferably, clamp mechanism 14 is a nylon wire tie including a band 36 and a lock mechanism 38. Band 36 includes a series of incremental ridges (not shown), and lock mechanism 38 includes a pawl mechanism housed within an opening 39 through which band 36 extends. The pawl mechanism engages the ridges on the band 36 so as to lock the clamp mechanism in a closed position. Clamp mechanism 14 can be reduced in size by pulling band 36 through lock mechanism 38, but it cannot be expanded in size due to the pawl mechanism.

Figure 2:
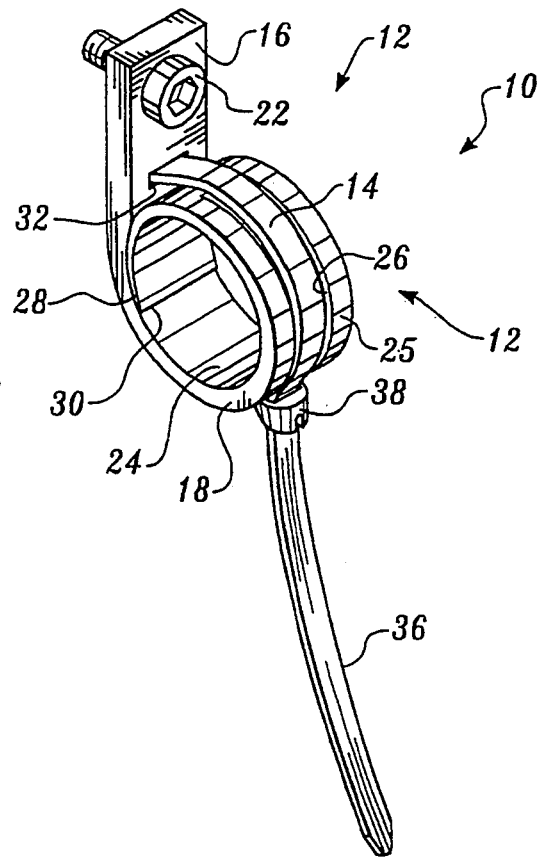
FIG. 2 is an assembled view of the adjustable clamp of FIG. 1, shown with the adjustable clamp in its upright position.

FIG. 2 shows the adjustable clamp 10 assembled. Clamp mechanism 14 is secured around loop portion 18 with band 36 of clamp mechanism 14 received within groove 26 on the outer surface 25 of loop portion 18. Groove 26 prevents band 36 from sliding laterally off of the outer surface 25 of loop portion 18. Band 36 also extends through opening 32 in base portion 16. The free end 28 of loop portion 18 engages inner surface 24 of loop portion 18, thereby forming a closed loop.

Figure 3:
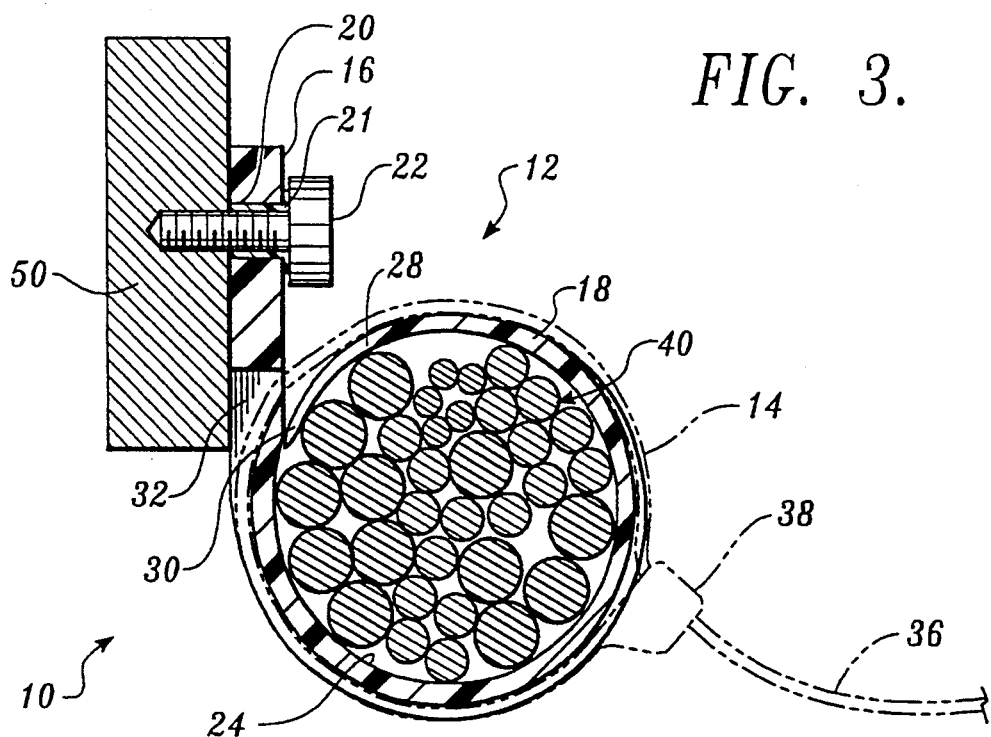
FIG. 3 is a section view of the clamp of FIG. 2.

As shown in FIG. 3, adjustable clamp 10 is shown in a closed, clamped position with a wiring harness 40 securely held by loop portion 18 such that the individual wires of wiring harness 40 are held in close engagement with each other. The clamp 10 is secured to a structure 50 by means of fastener 22. Preferably, mounting bracket 12 is secured to structure 50 with base portion 16 in an upright position, as shown. This configures loop portion 18 so that it supports wires 40 when loop portion 18 is opened, as discussed later.

Figure 4:
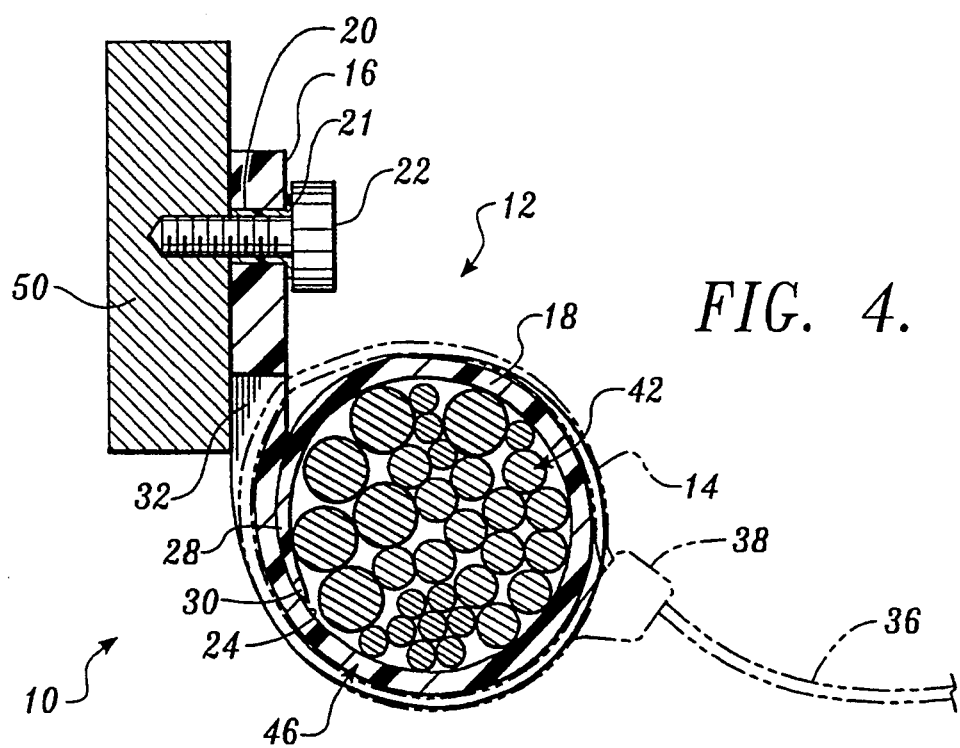
FIG. 4 is a section view like FIG. 3, shown with the clamp mechanism further tightened in order to contract the size of the loop portion of the clamp.

Should a wiring harness of smaller dimension be carried by adjustable clamp 10, as shown in FIG. 4, clamp mechanism 14 can be tightened so that the free end 28 of loop portion 18 moves progressively inwardly of the loop portion in engagement with the inner surface 24, thereby contracting the size of loop portion 18. In this manner, a wiring harness 42 of smaller size than wiring harness 40 can be held securely within loop portion 18, as is the larger size wiring harness 40 of FIG. 3. This arrangement allows for the provision of a smaller inventory of clamp sizes to accommodate a range of wiring harness sizes.

Preferably, the mounting bracket 12 is made of a material having sufficient flexibility and resiliency to allow the size of loop portion 18 to be adjustable within a range of sizes. For many types of material, the free end 28 of loop portion 18 will be able to extend inwardly of the loop to a point corresponding with point 46 upon full tightening of clamp mechanism 14. This degree of contraction of loop portion 18 corresponds to approximately a 20% to 30% reduction in the diameter of the loop portion 18. For some materials, a greater degree of contraction may be achievable.

Figure 5:
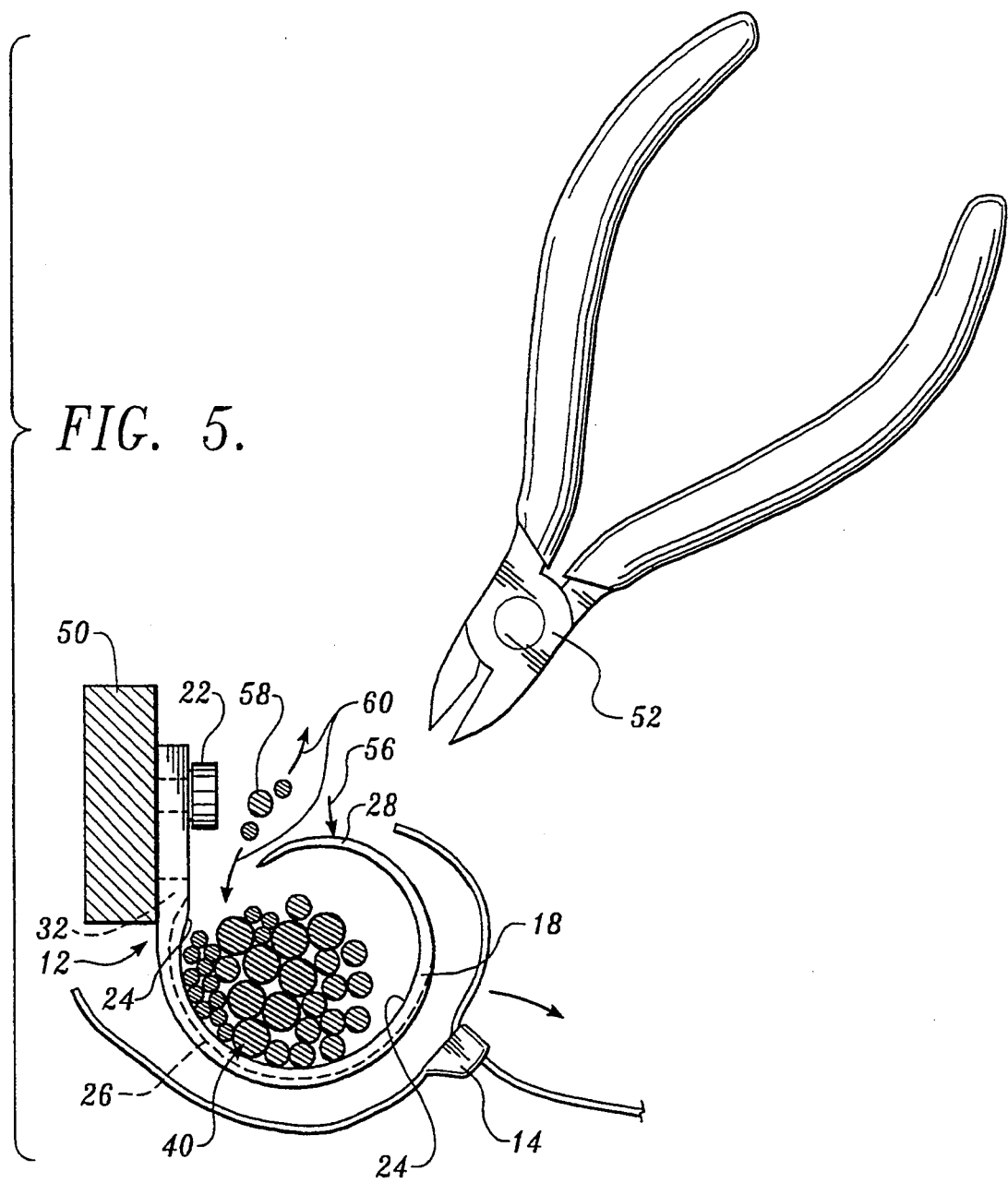
FIG. 5 is a side view of the clamp of FIG. 2, shown with a bundle of wires supported by the loop portion, a few individual wires being added to or removed from the loop portion, and the clamp mechanism cut away in order to remove it from the loop portion and gain access to the wire bundle.

FIG. 5 shows the mounting bracket 12 secured to a structural member 50 by means of screw 22. The clamp mechanism 14 is shown being cut away from mounting bracket 12 by means of a cutting device 52. Removal of clamp mechanism 14 provides access to the wiring harness 40 held by loop portion 18. Upon removal of clamp mechanism 14, application of a force to the free end 28 of loop portion 18, as indicated by arrow 56, moves the free end 28 away from the inner surface 24 of loop portion 18 and creates a gap therebetween for insertion and removal of wires 58, as indicated by arrows 60. Upon the removal or addition of wires, free end 28 is released, and its natural resiliency brings it back into engagement with inner surface 24, thereby closing loop portion 18. To tighten loop portion 18, a new clamp mechanism is extended around loop portion 18, through opening 32, and into groove 26 extending around the perimeter of loop portion 18. The new clamp mechanism is tightened so that loop portion 18 contracts around the wiring harness 40 to the point where the wires are held in close engagement with each other.

Accordingly, a wiring harness clamp is provided that does not have to be demounted in order to add or remove wires from the clamp. The easily-removable and disposable clamp mechanism provides access to the loop portion. In addition, when loop portion 18 is opened, as shown in FIG. 5, the wiring harness does not tend to fall out of the loop. The opening in loop 18 is created above the wires.

Figure 6:
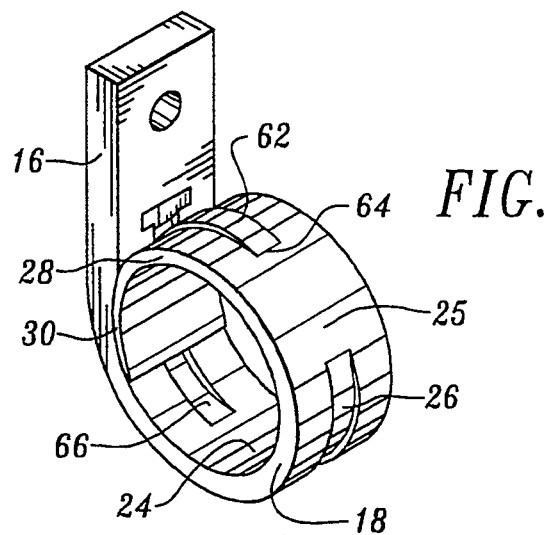
FIG. 6 is a pictorial view of an alternative embodiment for the base portion and loop portion of the clamp of FIG. 1, showing a ridge provided at the free end of the loop portion and a corresponding groove formed within the inner surface of the loop portion.
Figure 7:
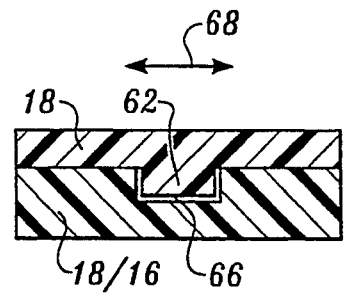
FIG. 7 is a sectional view showing the engagement of the ridge and groove shown in FIG. 6.

FIGS. 6 and 7 illustrate an alternative embodiment of the present invention. In FIG. 6, a ridge 62 is provided along the outer surface 25 of loop portion 18 at the free end 28 of loop portion 18. Ridge 62 extends centrally along the free end 28 for a portion of its length and terminates at point 64. At point 64, ridge 62 tapers to become flush with surface 25. The inner surface 24 of loop portion 18 and a portion of base portion 16 are provided with a corresponding groove 66, which extends centrally for a short length along loop portion 18. Ridge 62 and groove 66 are designed to engage in a tongue-and-groove arrangement, which prevents lateral movement of free end 28 with respect to inner surface 24. FIG. 7 illustrates the tongue-and-groove arrangement of ridge 62 and groove 66. The natural resiliency of loop portion 18 biases ridge 62 into groove 66 and maintains the tongue-and-groove arrangement therebetween. As can be seen in FIG. 7, ridge 62 is restrained from lateral movement, as indicated by arrow 68.

The general resiliency of mounting bracket 12 should keep free end 28 from becoming displaced laterally out beyond the lateral side edges of loop portion 18 without the provision of ridge 62 and groove 66. However, for certain mounting bracket materials and certain applications, provision of ridge 62 and corresponding groove 68 may be advisable.

Accordingly, it can be seen that a wiring harness clamp is now provided that is adjustable, provides for easy addition or removal of wires while the clamp is mounted to a structure, and supports the wires when the clamp is in an open position.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalence and reversal of parts.

What is claimed is:

1. An adjustable clamp for securing a bundle of wires or the like in close engagement, the clamp comprising:
   a base portion adapted for mounting to a structure,
   a loop portion, including an inner surface, an outer surface, and a free end extending from the base portion, the loop portion having sufficient flexibility so that the free end can engage the inner surface and be moved progressively inwardly of the loop in engagement with the inner surface thereof in order to contract the size of the loop, and can be moved away from the inner surface of the loop to create a gap for the insertion and removal of wires, and
   a clamp mechanism for securing around the outer surface of the loop portion in order to contract the size of the loop.

2. The adjustable clamp of claim 1, wherein the clamp mechanism is adjustable in order to selectively contract the size of the loop.

3. The adjustable clamp of claim 1, wherein the clamp mechanism is secured releasably around the loop portion and can be cut and removed from the loop portion in order to separate the free end of the loop portion from the inner surface.

4. The adjustable clamp of claim 1, wherein the free end of the loop portion is tapered.

5. The adjustable clamp of claim 1, wherein the base portion includes an opening through which the clamp mechanism is adapted to extend.

6. The adjustable clamp of claim 1, wherein the free end of the loop portion can be moved away from the inner surface of the loop to create a gap with the base portion mounted to the structure.

7. An adjustable clamp for securing a bundle of wires or the like in close engagement, the clamp comprising:
   a base portion adapted for mounting to a structure,
   a loop portion, including an inner surface, an outer surface, and a free end extending from the base portion, the free end adapted to engage the inner surface, the loop portion having sufficient flexibility so that the free end can be moved progressively inwardly of the loop in engagement with the inner surface thereof in order to contract the size of the loop, and can be moved away from the inner surface of the loop to create a gap for the insertion and removal of wires, and
   a clamp mechanism for securing around the outer surface of the loop portion in order to contract the size of the loop, and
   wherein the clamp mechanism includes a band and an incrementally adjustable lock mechanism, and the outer surface of the loop portion includes a groove for receiving the band and restraining lateral movement of the band with respect to the loop portion.

8. The adjustable clamp of claim 7, wherein the outer surface portion adjacent the free end of the loop portion includes a ridge, and the inner surface portion adjacent the base portion includes a groove for receiving the ridge, the ridge and groove adapted to restrain lateral movement of the free end with respect to the inner surface.

9. The adjustable clamp of claim 7, wherein the clamp mechanism includes a band and an incrementally adjustable lock mechanism, and the outer surface of the loop portion includes a groove for receiving the band and restraining lateral movement of the band with respect to the loop portion, and the opening in the base portion is contiguous the groove in the outer surface.

* * * * *